US012575710B2

(12) United States Patent
Narayana Pillai et al.

(10) Patent No.: US 12,575,710 B2
(45) Date of Patent: Mar. 17, 2026

(54) DISHWASHER WITH DOOR ASSEMBLY

(71) Applicant: WHIRLPOOL CORPORATION, Benton Harbor, MI (US)

(72) Inventors: Ajay Ram Narayana Pillai, Stevensville, MI (US); Andrius F. Rezende, Curitiba (BR); Arkadiusz M. Teclaw, Wroclaw (PL); Ameresh B. Viswanathan, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 24 days.

(21) Appl. No.: 18/742,515

(22) Filed: Jun. 13, 2024

(65) Prior Publication Data

US 2025/0380849 A1 Dec. 18, 2025

(51) Int. Cl.
*A47L 15/42* (2006.01)
*E05B 5/00* (2006.01)

(52) U.S. Cl.
CPC ....... *A47L 15/4265* (2013.01); *A47L 15/4274* (2013.01); *A47L 15/4293* (2013.01); *E05B 5/00* (2013.01)

(58) Field of Classification Search
None
See application file for complete search history.

(56) References Cited

U.S. PATENT DOCUMENTS

| | | | |
|---|---|---|---|
| D214,193 | S | 5/1969 | Swartz |
| D385,070 | S | 10/1997 | Hughes et al. |
| D424,257 | S | 5/2000 | Umeda et al. |
| 7,216,944 | B2 | 5/2007 | Oyler et al. |
| D577,869 | S | 9/2008 | Tartan et al. |
| 8,740,320 | B2 | 6/2014 | Eng |
| 9,955,844 | B2 | 5/2018 | Fletty et al. |
| D827,951 | S | 9/2018 | Lee et al. |
| D864,504 | S | 10/2019 | Kim et al. |
| D866,883 | S | 11/2019 | Kim et al. |
| D885,695 | S | 5/2020 | Kim |
| 11,617,491 | B2 | 4/2023 | Park et al. |
| 2008/0276976 | A1 | 11/2008 | Buller et al. |
| 2011/0181516 | A1 | 7/2011 | Mallory et al. |
| 2015/0157184 | A1 | 6/2015 | Alexander |

(Continued)

FOREIGN PATENT DOCUMENTS

| | | | | |
|---|---|---|---|---|
| CN | 116807350 A | * 9/2023 | | ......... A47L 15/4257 |
| KR | 20170139802 A | 12/2017 | | |

(Continued)

*Primary Examiner* — Omair Chaudhri
(74) *Attorney, Agent, or Firm* — McGarry Bair PC

(57) ABSTRACT

A dishwasher for treating dishes according to a cycle of operation, the dishwasher comprising a tub at least partially defining a treating chamber having an open face for receiving dishes, and a door assembly movable between opened and closed positions. The door assembly includes a single-piece, outer panel and a pocket handle assembly. The outer panel defines a front face at least partially bounded by a left sidewall and a right sidewall, and has a pocket opening spanning the front face between and including a portion of the left sidewall and the right sidewall to form a corresponding left notch in the left sidewall and a right notch in the right sidewall. The pocket handle assembly is accessible through the pocket opening.

20 Claims, 11 Drawing Sheets

(56) References Cited

U.S. PATENT DOCUMENTS

| | | | | |
|---|---|---|---|---|
| 2015/0198940 | A1 | 7/2015 | Hwang et al. | |
| 2019/0059693 | A1* | 2/2019 | Kendall | A47L 15/4261 |
| 2020/0060509 | A1* | 2/2020 | Ponkshe | A47L 15/4293 |
| 2020/0405121 | A1 | 12/2020 | Park et al. | |
| 2023/0145985 | A1* | 5/2023 | Kremmel | A47L 15/4257 16/412 |
| 2023/0240505 | A1* | 8/2023 | Kremmel | A47L 15/4257 292/336.3 |
| 2023/0277032 | A1* | 9/2023 | Kremmel | A47L 15/4257 134/201 |
| 2023/0371190 | A1* | 11/2023 | Berry | A47L 15/4293 |
| 2024/0122439 | A1* | 4/2024 | Kremmel | A47L 15/4265 |
| 2025/0160606 | A1* | 5/2025 | Park | A47L 15/4293 |

FOREIGN PATENT DOCUMENTS

| | | | |
|---|---|---|---|
| KR | 20200082114 | A | 7/2020 |
| WO | 2020138774 | A1 | 7/2020 |

* cited by examiner

DISHWASHER WITH DOOR ASSEMBLY

BACKGROUND

Dishwashers are a commonplace household appliance designed to efficiently clean, sanitize, and dry soiled dishes, thereby alleviating the user from the burden of a hands-on, time-consuming household chore. Contemporary dishwashers for use in a typical household include a receiving tub having an open front as an access opening. The receiving a tub at least partially defines a treating chamber into which items, such as dishes, utensils, and glassware, can be placed to undergo a washing operation. The dishwasher generally includes a door assembly pivotally mounted to the tub that closes and seals the open front during the washing operation.

Traditional door assemblies typically include a frame that carries at least one of either an inner or outer door panel. A handle can be included in the outer panel. A user interface can be carried by at least one of the frame or outer panel. The user interface can include a controller, such as a printed circuit board (PCB), and a touch interface cooperating with switches and sensors on the PCB. The controller can be located in an interior defined by the frame, inner panel, and outer panel.

BRIEF DESCRIPTION

In one aspect, the disclosure relates to a dishwasher. The dishwasher includes a cabinet defining an interior, a tub located within the interior and defining a washing chamber with an open face, and a door assembly moveably mounted to the cabinet for selectively closing the open face. The door assembly includes a single-piece, outer panel defining a front face at least partially bounded by a left sidewall and a right sidewall. The outer panel has a pocket opening spanning the front face between and including a portion of the left sidewall and a portion of the right sidewall to form a corresponding left notch in the left sidewall and a right notch in the right sidewall. The door assembly further includes a pocket handle assembly accessible through the pocket opening. The pocket handle assembly spans the pocket opening and closes a portion of the left notch and a portion of the right notch. The pocket handle assembly defines a front surface accessible through the pocket opening.

In another aspect, the disclosure relates to a dishwasher. The dishwasher includes a cabinet defining an interior, a tub located within the interior and defining a washing chamber with an open face, and a door assembly moveably mounted to the cabinet for selectively closing the open face. The door assembly includes a single-piece, outer panel defining a front face at least partially bounded by a left sidewall and a right sidewall, a rear face obverse of the front face, and a pocket opening spanning the front face between and including a portion of the left sidewall and the right sidewall to form a corresponding left notch in the left sidewall and a right notch in the right sidewall, and a pocket handle assembly. The pocket handle assembly includes a rear housing affixed to the rear face and aligned with the pocket opening, and a front housing affixed to the rear housing and spanning the pocket opening. The front housing has a left tab closing at least a portion of the left notch and a right tab closing at least a portion of the right notch.

DETAILED DESCRIPTION

Approximating language, as used herein throughout the specification and claims, is applied to modify any quantitative representation that could permissibly vary without resulting in a change in the basic function to which it is related. Accordingly, a value modified by a term such as “about,” “approximately,” “generally,” or “substantially” is not to be limited to the precise value specified. In some instances, such approximating language can correspond to the precision of an instrument for measuring the value, or to the precision of a device or method for constructing or manufacturing the components and/or systems. For example, “about,” “approximately,” “generally,” or “substantially” can refer to being within a 10 percent margin.

Joinder references (e.g., attached, coupled, connected, abutting, and the like) are to be construed broadly and may include intermediate members between a connection of elements, direct connections, indirect connections, fixed connections, movable connections, operative connections, indirect contact, and/or direct contact. As such, joinder references do not necessarily imply that two elements are directly connected/coupled and in fixed relation to each other unless otherwise stated. Connections of electrical components, if any, may include mechanical connections, electrical connections, wired connections, and/or wireless connections, among others. Uses of “e.g.” and “such as” in the specification are to be construed broadly and are used to provide non-limiting examples of embodiments of the disclosure, and the disclosure is not limited to such examples.

Figure 1:
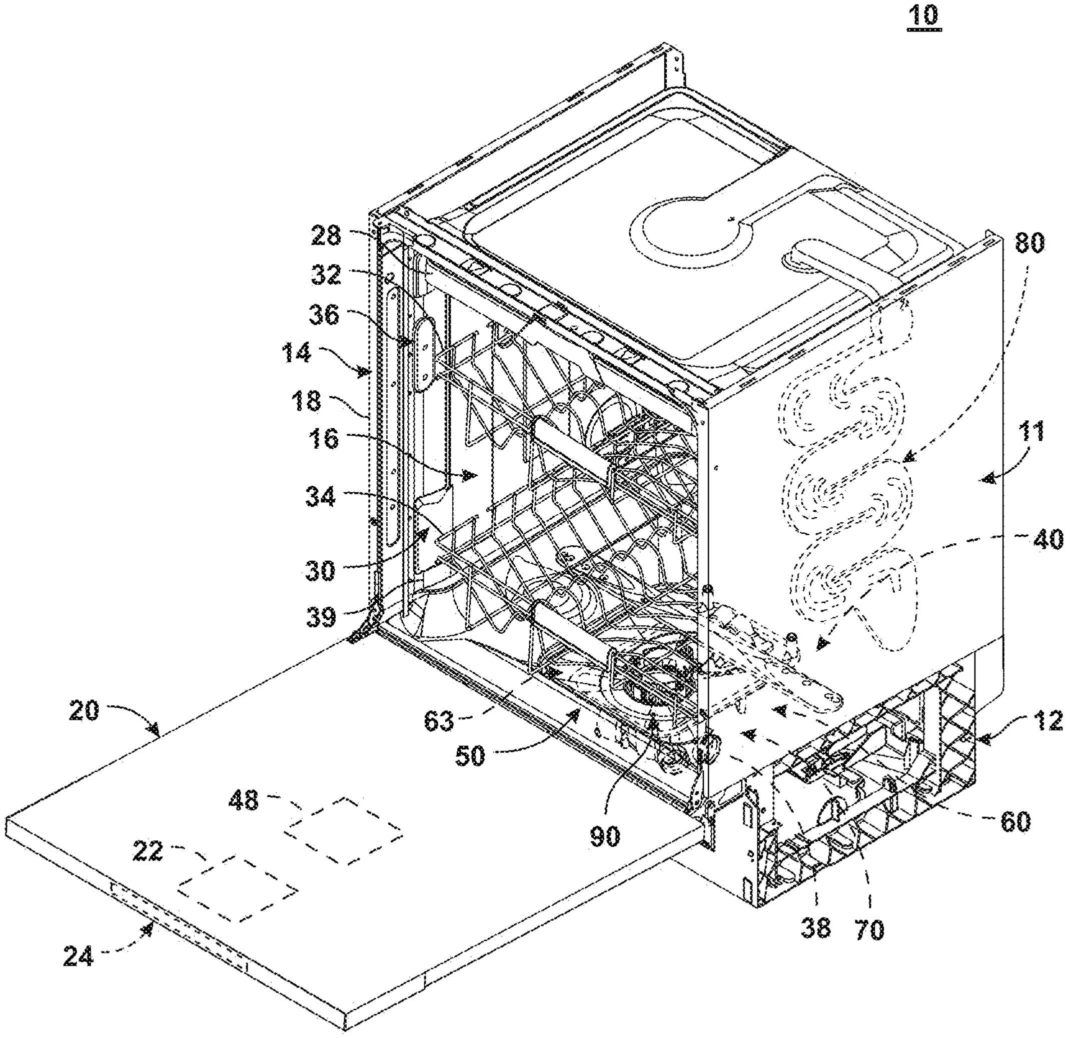
FIG. 1 is a right-side perspective view of an automatic dishwasher having multiple systems for implementing an automatic cycle of operation.

FIG. 1 illustrates an automatic dishwasher 10 capable of implementing an automatic cycle of operation to treat dishes. As used in this description, the term "dish(es)" is intended to be generic to any item, single or plural, that can be treated in the dishwasher 10, including, without limitation, dishes, plates, pots, bowls, pans, glassware, and silverware. As illustrated, the dishwasher 10 is a built-in dishwasher implementation, which is designed for mounting under a countertop. However, this description is applicable to other dishwasher implementations such as a stand-alone, a drawer-type or a sink-type, for example.

The dishwasher 10 has a variety of systems, some of which are controllable, to implement the automatic cycle of operation. A cabinet 11 is provided to support the variety of systems needed to implement the automatic cycle of operation. As illustrated, for a built-in implementation, the cabinet 11 includes a frame in the form of a base 12 on which is supported an open-faced tub 14, which at least partially defines a treating chamber 16, having an open face 18, for receiving the dishes. A closure in the form of a door assembly 20 is pivotally mounted to the base 12 for movement between opened and closed positions to selectively open and close the open face 18 of the tub 14. Thus, the door assembly 20 provides selective accessibility to the treating chamber 16 for the loading and unloading of dishes or other items.

The cabinet 11, as in the case of the built-in dishwasher implementation, can be formed by other parts of the dishwasher 10, like the tub 14 and the door assembly 20, in addition to a dedicated frame structure, like the base 12, with them all collectively forming a uni-body frame to which the variety of systems are supported. In other implementations, like the drawer-type dishwasher, the cabinet 11 can be a tub that is slidable relative to a frame, with the closure being a part of the cabinet 11 or the countertop of the surrounding cabinetry. In a sink-type implementation, the sink forms the tub and the cover closing the open top of the sink forms the closure. Sink-type implementations are more commonly found in recreational vehicles.

The systems supported by the cabinet 11, while essentially limitless, can include dish holding system 30, spray system 40, recirculation system 50, drain system 60, water supply system 70, drying system 80, heating system 90, and filter system 63. These systems are used to implement one or more treating cycles of operation for the dishes, for which there are many, and one of which includes a traditional automatic wash cycle.

A basic traditional automatic wash cycle of operation has a wash phase, where a detergent/water mixture is recirculated and then drained, which is then followed by a rinse phase where water alone or with a rinse agent is recirculated and then drained. An optional drying phase can follow the rinse phase. More commonly, the automatic wash cycle has multiple wash phases and multiple rinse phases. The multiple wash phases can include a pre-wash phase where water, with or without detergent, is sprayed or recirculated on the dishes, and can include a dwell or soaking phase. There can be more than one pre-wash phase. A wash phase, where water with detergent is recirculated on the dishes, follows the pre-wash phases. There can be more than one wash phase; the number of which can be sensor controlled based on the amount of sensed soils in the wash liquid. One or more rinse phases will follow the wash phase(s), and, in some cases, come between wash phases. The number of wash phases can also be sensor controlled based on the amount of sensed soils in the rinse liquid. The wash phases and rinse phases can include the heating of the water, even to the point of one or more of the phases being hot enough for long enough to sanitize the dishes. A drying phase can follow the rinse phase(s). The drying phase can include a drip dry, heated dry, condensing dry, air dry or any combination.

A controller 22 can also be included in the dishwasher 10 and operably couples with and controls the various components of the dishwasher 10 to implement the cycle of operation. The controller 22 can be located within the door assembly 20 as illustrated, or it can alternatively be located somewhere within the cabinet 11. The controller 22 can also be operably coupled with a control panel or user interface 24 for receiving user-selected inputs and communicating information to the user. The user interface 24 can include operational controls such as dials, lights, switches, and displays enabling a user to input commands, such as a cycle of operation, to the controller 22 and receive information.

While the user interface 24 is illustrated along a top surface of the door assembly 20, it is contemplated the user interface can be provided on any suitable portion of the door assembly 20, including a front surface or a side surface in some non-limiting examples. In some implementations, the user interface 24 can include multiple interfaces, control panels, indicators, or the like. Such multiple interfaces can be positioned on a single surface of the door assembly 20, or on multiple surfaces of the door assembly 20, such as a first user interface on a top surface and a second user interface on an outer surface in one example. The user interface 24 can include any suitable type or number of interfaces, control panels, indicators, or the like.

The dish holding system 30 can include any suitable structure for holding dishes within the treating chamber 16. Exemplary dish holders are illustrated in the form of an upper dish racks 32 and a lower dish rack 34, commonly referred to as "racks", which are located within the treating chamber 16. The upper dish racks 32 and the lower dish rack 34 are typically mounted for slidable movement in and out of the treating chamber 16 through the open face 18 for ease of loading and unloading. Drawer guides/slides/rails 36 are typically used to slidably mount the upper dish rack 32 to the tub 14. The lower dish rack 34 typically has wheels or rollers 38 that roll along rails 39 formed in sidewalls of the tub 14 and onto the door assembly 20, when the door assembly 20 is in the opened position.

Dedicated dish holders can also be provided. One such dedicated dish holder is a third level rack 28 located above the upper dish rack 32. Like the upper dish rack 32, the third level rack is slidably mounted to the tub 14 with drawer guides/slides/rails 36. The third level rack 28 is typically used to hold utensils, such as tableware, spoons, knives, spatulas, etc., in an on-the-side or flat orientation. However, the third level rack 28 is not limited to holding utensils. If an item can fit in the third level rack, it can be washed in the third level rack 28. The third level rack 28 generally has a much shorter height or lower profile than the upper and the lower dish racks 32, 34. Typically, the height of the third level rack is short enough that a typical glass cannot be stood vertically in the third level rack 28 and the third level rack 28 still slide into the treating chamber 16.

Another dedicated dish holder can be a silverware basket (not shown), which is typically carried by one of the upper or the lower dish racks 32, 34 or mounted to the door assembly 20. The silverware basket typically holds utensils and the like in an upright orientation as compared to the on-the-side or flat orientation of the third level rack 28.

A dispenser assembly 48 is provided to dispense treating chemistry, e.g. detergent, anti-spotting agent, etc., into the treating chamber 16. The dispenser assembly 48 can be mounted on an inner surface of the door assembly 20, as shown, or can be located at other positions within the cabinet 11. The dispenser assembly 48 can dispense one or more types of treating chemistries. The dispenser assembly 48 can be a single-use dispenser or a bulk dispenser, or a combination of both.

Figure 2:
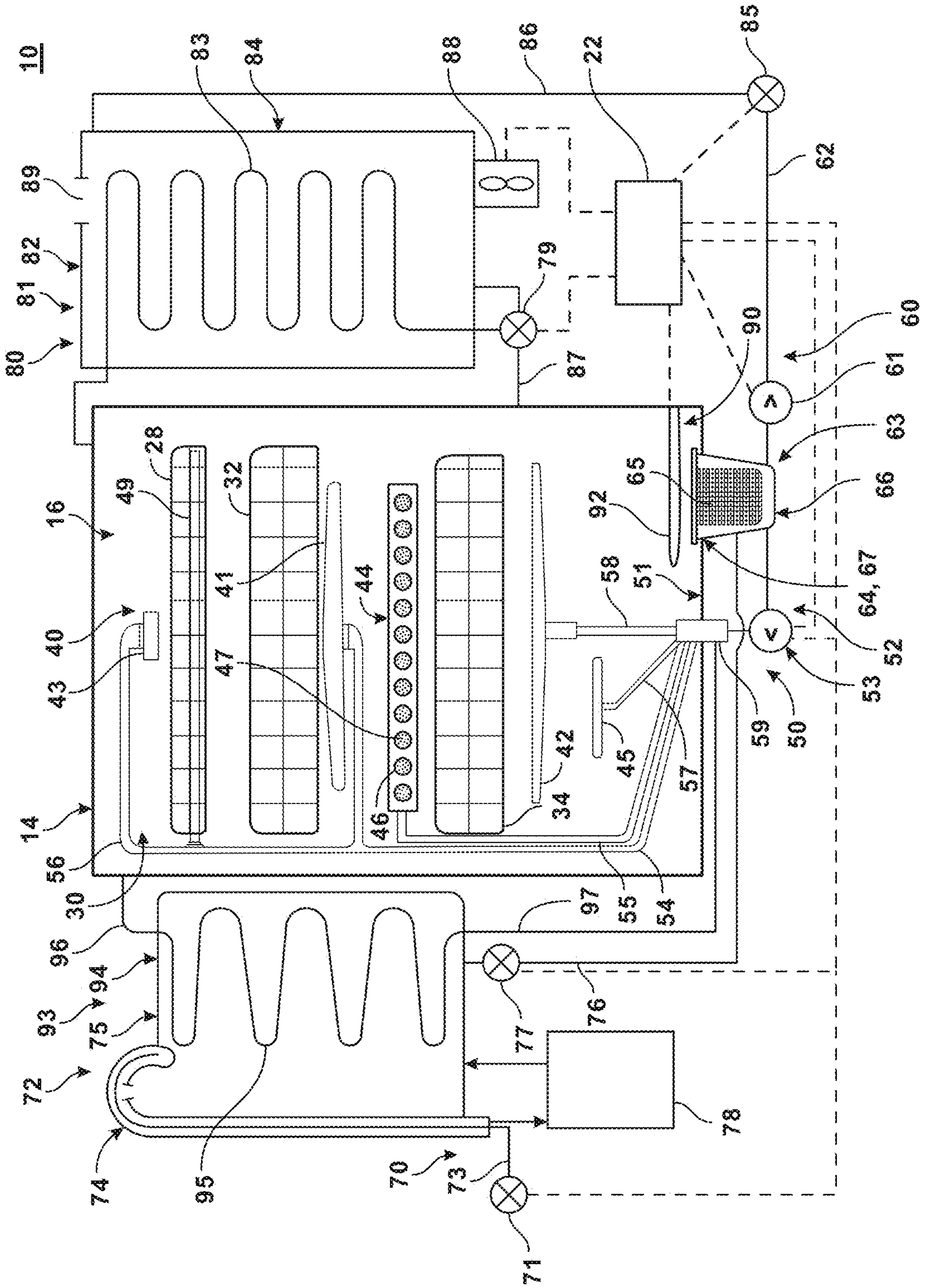
FIG. 2 is a schematic view of the dishwasher of FIG. 1 and illustrates at least some of the plumbing and electrical connections between at least some systems.

Turning to FIG. 2, the spray system 40 is provided for spraying liquid in the treating chamber 16 and can have multiple spray assemblies or sprayers, some of which can be dedicated to a particular one of the dish holders, to particular area of a dish holder, to a particular type of cleaning, or to a particular level of cleaning, etc. The sprayers can be fixed or movable, such as rotating, relative to the treating chamber 16 or dish holder. Five exemplary sprayers are illustrated and include an upper spray arm 41, a lower spray arm 42, a third level sprayer 43, a deep-clean sprayer 44, and a spot sprayer 45. The upper spray arm 41 and the lower spray arm 42 are rotating spray arms, located below the upper dish rack 32 and the lower dish rack 34, respectively, and rotate about a generally centrally located and vertical axis. The third level sprayer 43 is located above the third level rack 28. The third level sprayer 43 is illustrated as being fixed, but could move, such as in rotating. In addition to the third level sprayer 43 or in place of the third level sprayer 43, a sprayer 49 can be located at least in part below a portion of the third level rack 28. The sprayer 49 is illustrated as a fixed tube, carried by the third level rack 28, but could move, such as in rotating about a longitudinal axis.

The deep-clean sprayer 44 is a manifold extending along a rear wall of the tub 14 and has multiple nozzles 46, with multiple apertures 47, generating an intensified and/or higher pressure spray than the upper spray arm 41, the lower spray arm 42, or the third level sprayer 43. The nozzles 46 can be fixed or move, such as in rotating. The spray emitted by the deep-clean sprayer 44 defines a deep clean zone, which is illustrated along a rear side of the lower dish rack 34. Thus, dishes needing deep cleaning, such as dishes with baked-on food, can be located in the lower dish rack 34 to face the deep-clean sprayer 44. The deep-clean sprayer 44, while illustrated as only one unit on a rear wall of the tub 14 could include multiple units and/or extend along multiple portions, including different walls, of the tub 14, and can be provide above, below or beside any of the dish holders with deep-cleaning is desired.

The spot sprayer 45, like the deep-clean sprayer, can emit an intensified and/or higher-pressure spray, especially to a discrete location within one of the dish holders. While the spot sprayer 45 is shown below the lower dish rack 34, it could be adjacent to any part of any dish holder or along any wall of the tub where special cleaning is desired. In the illustrated location below the lower dish rack 34, the spot sprayer can be used independently of or in combination with the lower spray arm 42. The spot sprayer 45 can be fixed or can move, such as in rotating.

These five sprayers are illustrative examples of suitable sprayers and are not meant to be limiting as to the type of suitable sprayers.

The recirculation system 50 recirculates the liquid sprayed into the treating chamber 16 by the sprayers of the spray system 40 back to the sprayers to form a recirculation loop or circuit by which liquid can be repeatedly sprayed, continuously sprayed, or any combination thereof onto dishes in the dish holders. The recirculation system 50 can include a sump 51 and a pump assembly 52. The sump 51 collects the liquid sprayed in the treating chamber 16 and can be formed by a sloped or recess portion of a bottom wall of the tub 14. The pump assembly 52 can include one or more pumps such as recirculation pump 53. The sump 51 can also be a separate module that is affixed to the bottom wall and include the pump assembly 52.

Multiple supply conduits 54, 55, 56, 57, 58 fluidly couple the sprayers 43, 44, 45, 49 to the recirculation pump 53. A recirculation valve 59 can selectively fluidly couple each of the conduits 54-58 to the recirculation pump 53. While each sprayer 43, 44, 45, 49 is illustrated as having a corresponding dedicated supply conduit 54-58 one or more subsets, comprising multiple sprayers from the total group of sprayers 43, 44, 45, 49, can be supplied by the same conduit, negating the need for a dedicated conduit for each sprayer. For example, a single conduit can supply the upper spray arm 41 and the third level sprayer 43. Another example is that the sprayer 49 is supplied liquid by the conduit 56, which also supplies the third level sprayer 43.

The recirculation valve 59, while illustrated as a single valve, can be implemented with multiple valves. Additionally, one or more of the conduits can be directly coupled to the recirculation pump 53, while one or more of the other conduits can be selectively coupled to the recirculation pump with one or more valves. There are essentially an unlimited number of plumbing schemes to connect the recirculation system 50 to the spray system 40. The illustrated plumbing is not limiting.

A drain system 60 drains liquid from the treating chamber 16. The drain system 60 can include a drain pump 61 fluidly coupling the treating chamber 16 to a drain line 62. As illustrated the drain pump 61 can fluidly couple the sump 51 to the drain line 62.

While separate recirculation pumps 53 and drain pumps 62 are illustrated, a single pump can be used to perform both the recirculating and the draining functions. Alternatively, the drain pump 61 can be used to recirculate liquid in combination with the recirculation pump 53. When both a recirculation pump 53 and drain pump 61 are used, the drain pump 61 is typically more robust than the recirculation pump 53 as the drain pump 61 tends to have to remove solids and soils from the sump 51, unlike the recirculation pump 53, which tends to recirculate liquid which has solids and soils filtered away to some extent.

A water supply system 70 is provided for supplying fresh water to the dishwasher 10 from a household water supply via a household water valve 71. The water supply system 70 includes a water supply unit 72 having a water supply conduit 73 with a siphon break 74. While the water supply conduit 73 can be directly fluidly coupled to the tub 14 or any other portion of the dishwasher 10, the water supply conduit is shown fluidly coupled to a supply tank 75, which can store the supplied water prior to use. The supply tank 75 is fluidly coupled to the sump 51 by a supply line 76, which can include a controllable valve 77 to control when water is released from the supply tank 75 to the sump 51.

The supply tank 75 can be conveniently sized to store a predetermined volume of water, such as a volume required for a phase of the cycle of operation, which is commonly referred to as a "charge" of water. The storing of the water in the supply tank 75 prior to use is beneficial in that the water in the supply tank 75 can be "treated" in some manner, such as softening or heating prior to use.

A water softener 78 is provided with the water supply system 70 to soften the fresh water. The water softener 78 is shown fluidly coupling the water supply conduit 73 to the supply tank 75 so that the supplied water automatically passes through the water softener 78 on the way to the supply tank 75. However, the water softener 78 could directly supply the water to any other part of the dishwasher 10 than the supply tank 75, including directly supplying the tub 14. Alternatively, the water softener 78 can be fluidly coupled downstream of the supply tank 75, such as in-line with the supply line 76. Wherever the water softener 78 is fluidly coupled, it can be done so with controllable valves, such that the use of the water softener 78 is controllable and not mandatory.

A drying system 80 is provided to aid in the drying of the dishes during the drying phase. The drying system as illustrated includes a condensing assembly 81 having a condenser 82 formed of a serpentine conduit 83 with an inlet fluidly coupled to an upper portion of the tub 14 and an outlet fluidly coupled to a lower portion of the tub 14, whereby moisture laden air within the tub 14 is drawn from the upper portion of the tub 14, passed through the serpentine conduit 83, where liquid condenses out of the moisture laden air and is returned to the treating chamber 16 where it ultimately evaporates or is drained via the drain pump 61. The serpentine conduit 83 can be operated in an open loop configuration, where the air is exhausted to atmosphere, a closed loop configuration, where the air is returned to the treating chamber, or a combination of both by operating in one configuration and then the other configuration.

To enhance the rate of condensation, the temperature difference between the exterior of the serpentine conduit 83 and the moisture laden air can be increased by cooling the exterior of the serpentine conduit 83 or the surrounding air. To accomplish this, an optional cooling tank 84 is added to the condensing assembly 81, with the serpentine conduit 83 being located within the cooling tank 84. The cooling tank 84 is fluidly coupled to at least one of the spray system 40, recirculation system 50, drain system 60 or water supply system 70 such that liquid can be supplied to the cooling tank 84. The liquid provided to the cooling tank 84 from any of the systems 40-70 can be selected by source, by phase of cycle of operation, or any combination thereof such that the liquid is at a lower temperature than the moisture laden air or even lower than the ambient air.

As illustrated, the liquid is supplied to the cooling tank 84 by the drain system 60. A valve 85 fluidly connects the drain line 62 to a supply conduit 86 fluidly coupled to the cooling tank 84. A return conduit 87 fluidly connects the cooling tank 84 back to the treating chamber 16 via a return valve 79. In this way a fluid circuit is formed by the drain pump 61, drain line 62, valve 85, supply conduit 86, cooling tank 84, return valve 79 and return conduit 87 through which liquid can be supplied from the treating chamber 16, to the cooling tank 84, and back to the treating chamber 16. Alternatively, the supply conduit 86 could fluidly couple to the drain line 62 if re-use of the water is not desired.

To supply cold water from the household water supply via the household water valve 71 to the cooling tank 84, the water supply system 70 would first supply cold water to the treating chamber 16, then the drain system 60 would supply the cold water in the treating chamber 16 to the cooling tank 84. It should be noted that the supply tank 75 and cooling tank 84 could be configured such that one tank performs both functions.

The drying system 80 can use ambient air, instead of cold water, to cool the exterior of the serpentine conduit 83. In such a configuration, a blower 88 is connected to the cooling tank 84 and can supply ambient air to the interior of the cooling tank 84. The cooling tank 84 can have a vented top 89 to permit the passing through of the ambient air to allow for a steady flow of ambient air blowing over the serpentine conduit 83.

The cooling air from the blower 88 can be used in lieu of the cold water or in combination with the cold water. The cooling air will be used when the cooling tank 84 is not filled with liquid. Advantageously, the use of cooling air or cooling water, or combination of both, can be selected on the site-specific environmental conditions. If ambient air is cooler than the cold water temperature, then the ambient air can be used. If the cold water is cooler than the ambient air, then the cold water can be used. Cost-effectiveness can also be considered when selecting between cooling air and cooling water. The blower 88 can be used to dry the interior of the cooling tank 84 after the water has been drained. Suitable temperature sensors for the cold water and the ambient air can be provided and send their temperature signals to the controller 22, which can determine which of the two is colder at any time or phase of the cycle of operation.

A heating system 90 is provided for heating water used in the cycle of operation. The heating system 90 includes a heater 92, such as an immersion heater, located in the treating chamber 16 at a location where it will be immersed by the water supplied to the treating chamber 16. The heater 92 need not be an immersion heater, it can also be an in-line heater located in any of the conduits. There can also be more than one heater 92, including both an immersion heater and an in-line heater.

The heating system 90 can also include a heating circuit 93, which includes a heat exchanger 94, illustrated as a serpentine conduit 95, located within the supply tank 75, with a supply conduit 96 supplying liquid from the treating chamber 16 to the serpentine conduit 95, and a return conduit 97 fluidly coupled to the treating chamber 16. The heating circuit 93 is fluidly coupled to the recirculation pump 53 either directly or via the recirculation valve 59 such that liquid that is heated as part of a cycle of operation can be recirculated through the heat exchanger 94 to transfer the heat to the charge of fresh water residing in the supply tank 75. As most wash phases use liquid that is heated by the heater 92, this heated liquid can then be recirculated through the heating circuit 93 to transfer the heat to the charge of water in the supply tank 75, which is typically used in the next phase of the cycle of operation.

A filter system 63 is provided to filter un-dissolved solids from the liquid in the treating chamber 16. The filter system 63 includes a coarse filter 64 and a fine filter 65, which can be a removable basket 66 residing the sump 51, with the coarse filter 64 being a screen 67 circumscribing the removable basket 66. Additionally, the recirculation system 50 can include a rotating filter in addition to or in place of either or both of the coarse filter 64 and fine filter 65. Other filter arrangements are contemplated such as an ultrafiltration system.

Figure 3:
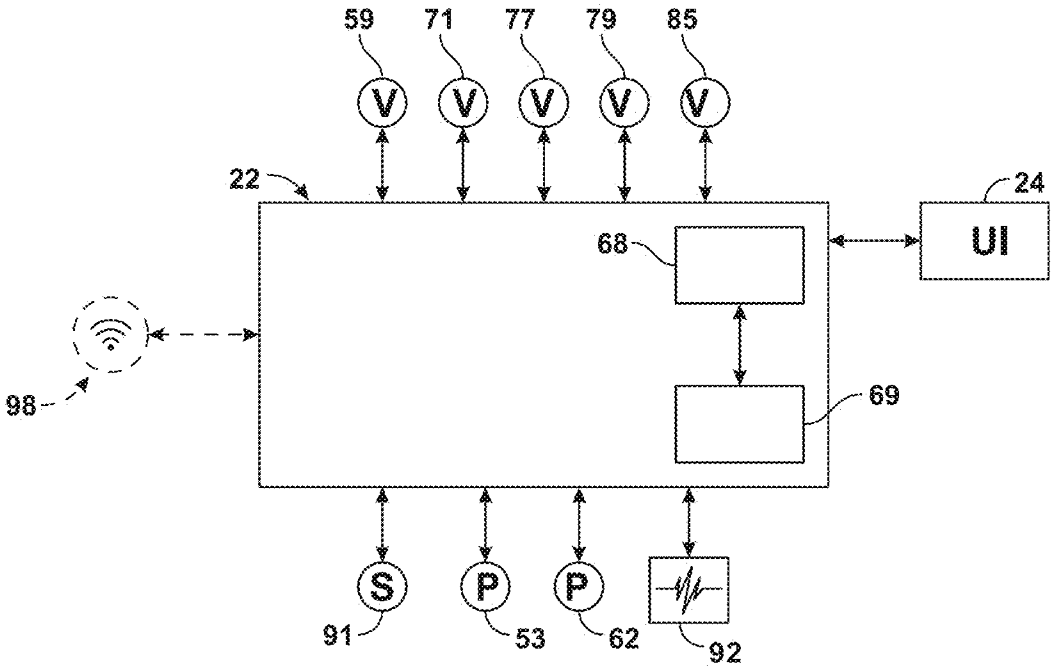
FIG. 3 is a schematic view illustrating a controller of the dishwasher of FIGS. 1 and 2.

As illustrated schematically in FIG. 3, the controller 22 can be coupled with the heater 92 for heating the wash liquid during a cycle of operation, the drain pump 61 for draining liquid from the treating chamber 16, and the recirculation pump 53 for recirculating the wash liquid during the cycle of operation. The controller 22 can be provided with a memory 68 and a central processing unit (CPU) 69. The memory 68 can be used for storing control software that can be executed by the CPU 69 in completing a cycle of operation using the dishwasher 10 and any additional software. For example, the memory 68 can store one or more pre-programmed automatic cycles of operation that can be selected by a user and executed by the dishwasher 10. The controller 22 can also receive input from one or more sensors 91. Non-limiting examples of sensors that can be communicably coupled with the controller 22 include, to name a few, ambient air temperature sensor, treating chamber temperature sensor, water supply temperature sensor, door open/close sensor, and turbidity sensor to determine the soil load associated with a selected grouping of dishes, such as the dishes associated with a particular area of the treating chamber. The controller 22 can also communicate with the recirculation valve 59, the household water valve 71, the controllable valve 77, the return valve 79, and the valve 85. Optionally, the controller 22 can include or communicate with a wireless communication device 98.

Figure 4:
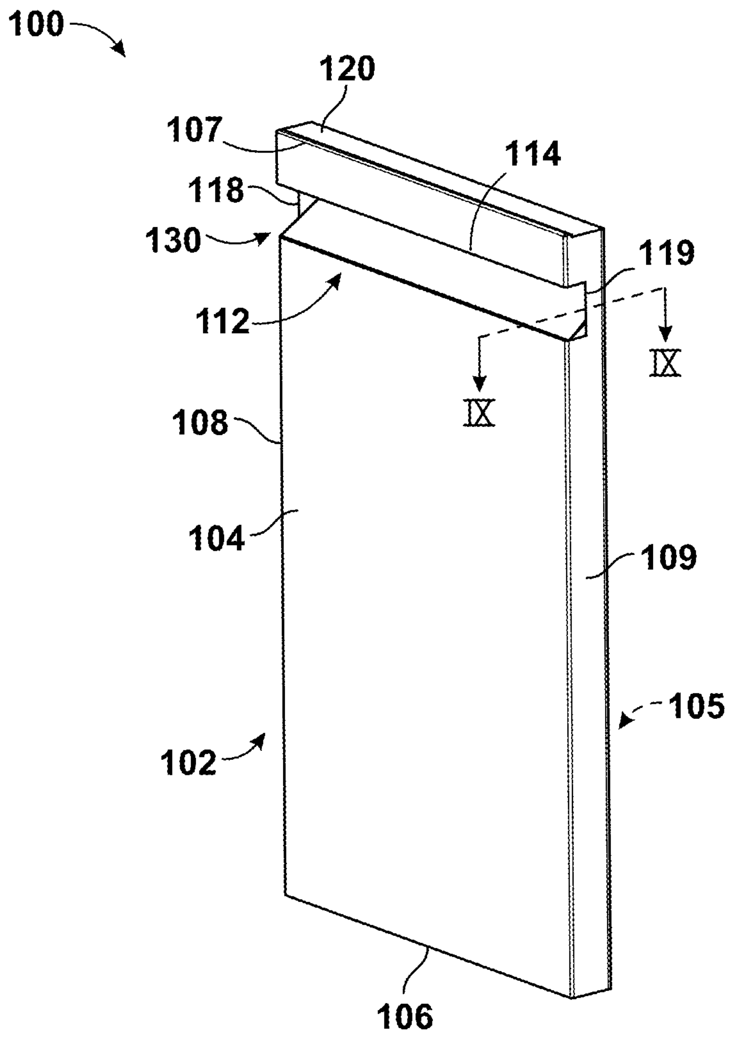
FIG. 4 is a perspective view of a door assembly suitable for use within the dishwasher of FIG. 1 in accordance with various aspects described herein.

Referring now to FIG. 4, a door assembly 100 is illustrated that is suitable for use with the dishwasher 10 of FIG. 1, including for use as the door assembly 20. The door assembly 100 can include an outer panel 102. The outer panel 102 can include a front face 104 and a rear face 105, with the rear face 105 opposite the front face 104. The outer panel 102 can further include a left sidewall 108 and a right sidewall 109 extending rearwardly from the front face 104 to form side walls of the outer panel 102. The front face 104 can be at least partially bounded by the left sidewall 108 and the right sidewall 109.

The outer panel 102 can also extend from a bottom edge 106 to a top edge 107. The bottom edge 106 of the outer panel 102 can define a bottom of the door assembly 100 where the door assembly is pivotally mounted to the base 12. The top edge 107 can be defined by upper terminal edges of the front face 104, the left sidewall 108, and the right sidewall 109. The top edge 107 can optionally be an open top edge 110 closed by a top cap 120.

A pocket opening 112 extends completely across the front face 104 and partially into each of the left and right sidewalls 108, 109. A portion of the pocket opening 112 along the left side wall 108 can define a left notch 118, as shown. Another portion of the pocket opening 112 along the right side wall 109 can define a right notch 119, as shown. A periphery 114 along the outer panel 102 defines an outside surface of the pocket opening 112. The door assembly 100 can further include a pocket handle assembly 130 coupled to the outer panel 102 and accessible through the pocket opening 112.

The outer panel 102, as illustrated, is formed from a single piece and has the pocket opening 112 formed in the single piece, which provides a continuous appearance for the outer panel 102. The outer panel 102, as discussed herein, is unlike prior outer panels, which were typically made of multiple pieces and have the opening formed at a junction of the multiple pieces. When the outer panel is made from metal, such as stainless steel, the outer panel is often stamped and the single piece is more aesthetically desirable. However, having a single piece outer panel comes with the complication of how to include the pocket handle assembly, which was previously just attached to a terminal end of the front face. The pocket opening 112, as discussed herein, is extended completely across the front face 104 and partially into each of the left and right sidewalls 108, 109 of the single piece, which provides access to the pocket handle assembly 130 and has the periphery 114 providing a surface for coupling the pocket handle assembly 130 to the outer panel 102.

The outer panel 102 can optionally include a vent or one or more apertures in the form of slots, holes, or other openings (not shown) in the outer panel 102 through which one of air, moisture, light, or combinations thereof can pass and can be provided on one or more of the front face 104, the left sidewall 108, the right sidewall 109, or a combination of both.

Figure 5:
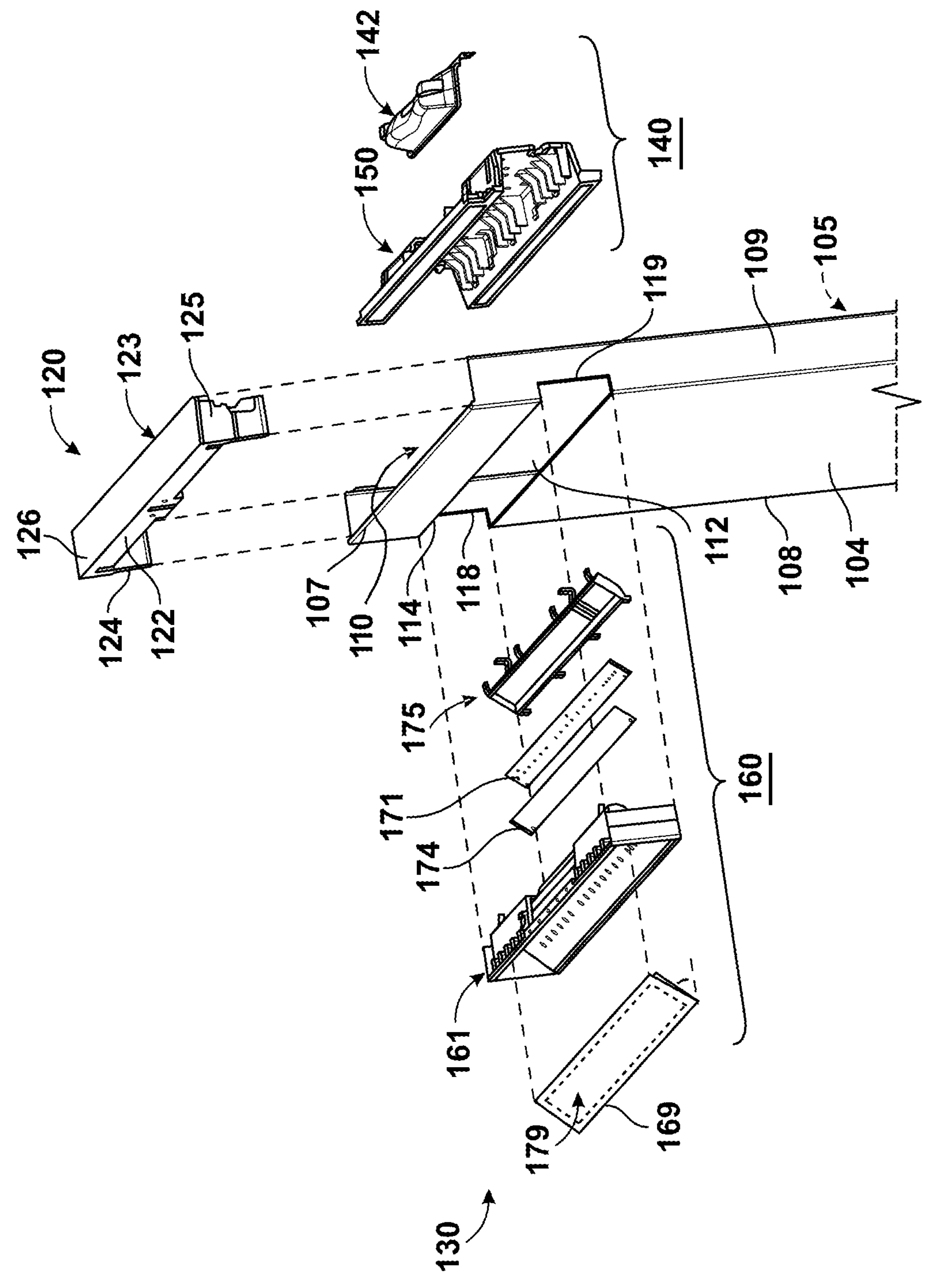
FIG. 5 is an exploded view of the door assembly of FIG. 4 illustrating a pocket handle assembly including an inner pocket assembly and an outer pocket assembly according to various aspects described herein.

Turning to FIG. 5, the door assembly 100 shown in an exploded view includes the outer panel 102 with the top cap 120 and the pocket handle assembly 130.

The top cap 120 includes front and rear flanges 122, 123, spaced-apart left and right cap sidewalls 124, 125, and a top surface 126, as illustrated. The front and rear flanges 122, 123 and the left and right cap sidewalls 124, 125 can collectively define a periphery of the top surface 126. The front and rear flanges 122, 123 and the left and right cap sidewalls 124, 125 can also extend downward from the top surface 126, as illustrated.

When installed to the outer panel 102, an edge of the top surface 126 of the top cap 120 can be located on or adjacent to the top edge 107 of the outer panel 102. Thus, the top cap 120 of the door assembly 100 closes the open top edge 110 of the outer panel 102. The top edge 107 of the outer panel 102 can include a seat on which to receive one of the left cap sidewall 124, right cap sidewall 125, front flange 122, rear flange 123, or any combination thereof. The left and right cap sidewalls 124, 125 can couple to respective left and right sidewalls 108, 109 of the outer panel 102.

The outer panel 102 can optionally include a fastening element (not shown) at the top edge 107 for securing the top cap 120 to the outer panel 102. As discussed herein, a "fastening element" is defined as one or more of a screw, an adhesive, a clip, a hook, a flexible detent, a biased latch, a receiving edge, a catch, a rives, snap-fasteners, a snap-fit locking mechanism, or any combination thereof.

Further, the outer panel 102 can optionally include a fastening element (not shown) at the periphery 114 for receiving the pocket handle assembly 130 and securing the pocket handle assembly 130 in the pocket opening 112 adjacent to, in contact with, or on the periphery 114.

The pocket handle assembly 130 spans the front face 104 of the outer panel 102 between and including a portion of the left sidewall 108 and a portion of the right sidewall 109. The pocket handle assembly 130 includes an inner pocket assembly 140 and an outer pocket assembly 160. The inner pocket assembly 140 and the outer pocket assembly 160 can be positioned on opposing sides of the outer panel 102 as shown. The outer pocket assembly 160 couples to the inner pocket assembly 140 by a fastening element (not shown).

The outer pocket assembly 160 includes a front housing 161 and an outer pocket panel 169 received within the front housing 161 and facing outward from the outer panel 102. In a non-limiting example, the outer pocket panel 169 can extend at an acute angle relative to the front face 104 of the outer panel 102 in assembled aspects of the door assembly 100. Further detail of the inner pocket assembly 140 and an outer pocket assembly 160 will be described in the subsequent Figures.

Figure 6:
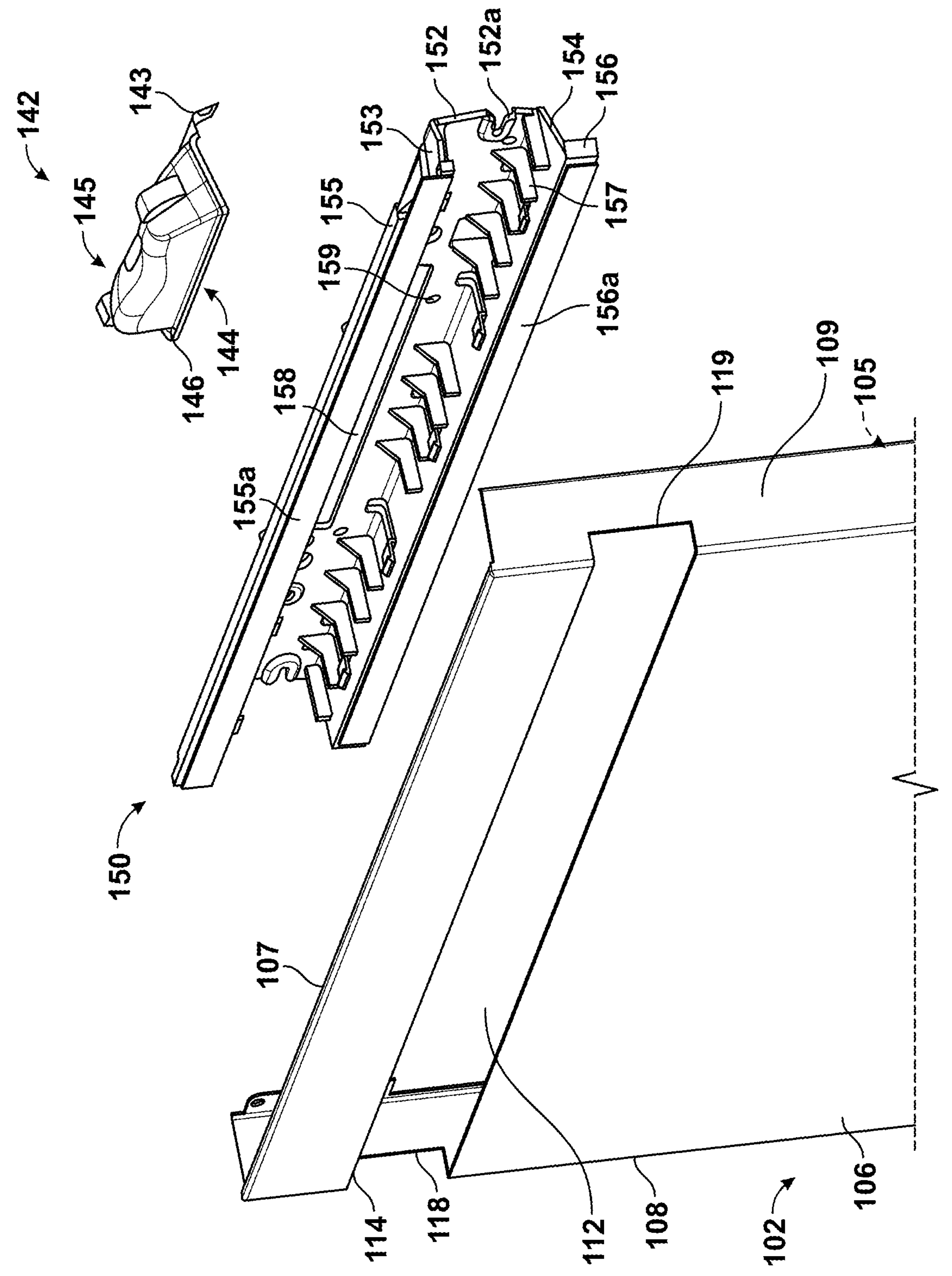
FIG. 6 is an exploded view of a portion of the door assembly of FIG. 5 illustrating the inner pocket assembly in further detail.

FIG. 6 is an exploded view of the inner pocket assembly 140 illustrating a handle 142 and a rear housing 150. The handle 142 can be a singular piece having an extension portion 143 for securing the handle 142 to the rear housing, and an ingress 144 defining a pocket handle 145 for the handle 142. The pocket handle 145 further includes a peripheral flange 146. As illustrated, the ingress 144 is oblong shaped and defines the pocket handle 145 as being cup-shaped. It should be understood that the pocket handle 145 and the ingress 144 can be any suitable shape enabling a user to grasp an inside edge of the ingress 144 to pull and move the door assembly 100 between opened and closed positions.

The pocket handle 145 can be accessed by a user through the pocket opening 112 when the inner pocket assembly 140 is mounted to the outer panel 102. In a non-limiting example, the pocket handle 145 can be centrally located between the left sidewall 108 and the right sidewall 109.

One or both of the extension portion 143 and peripheral flange 146 can abut the rear housing 150 to provide additional structural support for aligning and securing the handle 142 to the rear housing 150.

The rear housing 150 can include a mounting wall 152, and an upper sidewall 153 and a lower sidewall 154. One or both of the upper sidewall 153 and the lower sidewall 154 can extend outward from the mounting wall 152 toward the rear face 105 of the outer panel 102. One or both of the upper sidewall 153 and the lower sidewall 154 can be separately or integrally formed with the mounting wall 152. At least one of the upper and lower sidewalls 153, 154 can have one end thereof terminate and define upper and lower flanges 155, 156, respectively. In assembled aspects of the illustrated door assembly 100, upper and lower flanges 155, 156 abut the rear face 105 of the outer panel 102.

Gussets 157 can be along one or more surfaces of the rear housing 150 and can provide structural integrity to one or more of the mounting wall 152, the upper sidewall 153, the lower sidewall 154, the upper flange 155, and lower flange 156.

The mounting wall 152 can include an aperture 158 spanning an upper portion of the mounting wall 152. In aspects of the present disclosure, the aperture 158 extends horizontally in a center portion of the mounting wall 152. The aperture 158 has an oblong shape; however, it should be understood the aperture 158 can be of any suitable shape and size enabling a user to access the pocket handle 145 therethrough to pull and move the door assembly 100 between opened and closed positions. Alternatively, the aperture 158 can be located on any portion of the mounting wall 152 suitable for structurally maintaining access to the pocket handle 145 of the handle 142. The aperture 158 can span an upper portion of the mounting wall 152 between and including a portion of the upper sidewall 153 as illustrated. The ingress 144 of the pocket handle 145 can be accessed by a user through the pocket opening 112 when the inner pocket assembly 140 is mounted to the outer panel 102.

One or more mounting holes 159 can be along the rear housing 150 that correspond to one or more mounting pegs along a surface of the handle 142 contacting the rear housing 150. Additionally or alternatively, one or both of the handle 142 and the rear housing 150 can have a fastener or a fastening element such as an adhesive, a clip, a hook, a flexible detent, a biased latch, a receiving edge, a catch, a rivet, a snap-fit locking mechanism, or any other suitable means to secure connection therebetween handle 142 and rear housing 150.

The inner pocket assembly 140 can further include one or more fastening elements provided for securing the rear housing 150 to the outer panel 102. In the illustrated example, a fastening element includes upper and lower adhesive portions **155*a*, 156*a* disposed on the upper and lower flanges 155, 156, respectively. Thus, upper and lower adhesive portions 155*a*, 156*a* can adhere to the rear face 105 of the outer panel 102. Another fastener in the illustrated example includes embossments 152*a* configured to engage with a rivet, screw, receiving edge, or the like (not shown). It will be understood that fasteners for securing the rear housing 150 to the outer panel 102 can further include any suitable type of fastener or fastening element, such as an adhesive, a clip, a hook, a flexible detent, a biased latch, a receiving edge, a catch, a rivet, a snap-fit locking mechanism, or any other suitable means to secure the rear housing 150 to the outer panel 102**.

Figure 7:
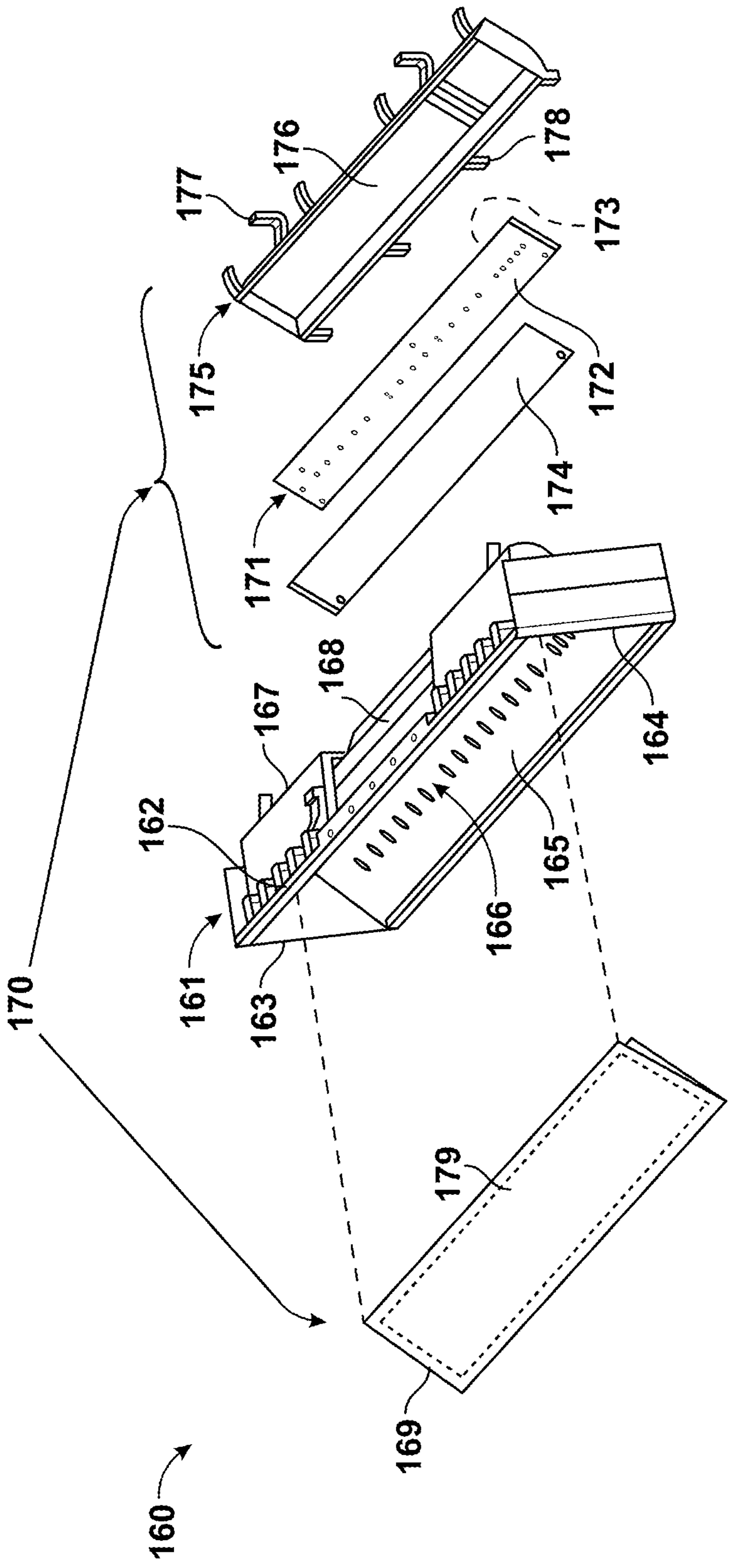
FIG. 7 is an exploded view of a portion of the door assembly of FIG. 5 illustrating the outer pocket assembly including a front housing and a human machine interface in accordance with various aspects described herein.

FIG. 7 is an exploded view of the outer pocket assembly 160. The outer pocket assembly 160 includes the front housing 161 having a top edge 162, a left edge 163, a right edge 164, and a front face 165 located below the top edge 162. The front face 165 can extend between the left edge 163 and the right edge 164.

The front housing 161 defines a handle recess 166 formed at least in a portion of the top edge 162. The front housing 161 further includes a back wall 167 extending between the front face 165 and the top edge 162. A portion of the handle recess 166 can be formed in the back wall 167. The portion of the handle recess 166 can further define an aperture 168 along an upper portion of the back wall 167 as shown. In aspects of the present disclosure, the aperture 168 can extend horizontally in a center portion of the back wall 167.

The front housing 161 includes the outer pocket panel 169 disposed thereon the front face 165. The outer pocket panel 169 can be separately formed with the front face 165, or integrally or unitarily formed with the front face 165, in some implementations. The outer pocket panel 169 can span the front face 165 between the left edge 163 and the right edge 164 as shown.

The outer pocket assembly 160 includes a human machine interface (HMI) 170 suitable for use as user interface 24 (FIG. 1). The HMI 170 includes a printed circuit board 171 supported by a retention bracket 175. The printed circuit board 171 can be configured for supporting controller 22 and various other control inputs or outputs of dishwasher 10 (FIG. 1). More specifically, as understood by one of ordinary skill in the art, the printed circuit board 171 can include or be operably coupled to one or more user inputs for receiving user input, to one or more displays or indicators for providing user notifications, e.g., by displaying indicators to indicate cycles or operating status, or any combination thereof.

According to the illustrated aspects, the printed circuit board 171 can be positioned behind the front housing 161 and interior to the retention bracket 175. The printed circuit board 171 can include a first side 172 and a second side 173, the second side 173 being opposite the first side 172.

By way of non-limiting example, the printed circuit board 171 can be mounted to the front housing 161 such that first side 172 of the printed circuit board 171 is mounted along the back wall 167. By way of additional or alternative non-limiting example, the printed circuit board 171 can be mounted with an adhesive portion 174 between the first side 172 of printed circuit board 171 and back wall 167 of the front housing 161.

In this regard, as a non-limiting example, at least a portion of the back wall 167 can be any suitable electrically insulated and opaque material that is mounted along the first side 172 of the printed circuit board 171, e.g., to serve as a rigid support to facilitate user interaction with the HMI 170.

As shown, the retention bracket 175 can contact the second side 173 of the printed circuit board 171. The retention bracket 175 defines a chamber 176 in a central portion of the retention bracket 175 for receiving the printed circuit board 171. The retention bracket 175 can be any suitable electrically insulated material to serve as a rigid support and ensure firm contact between printed circuit board 171 and front housing 161. Given variations in part tolerances and between stacked components, conventional mounting techniques for printed circuit boards can result in undesirable gaps that can lead to HMI 170 performance issues (i.e., failures in receiving user inputs). The retention bracket 175 can be designed to securely engage with the front housing 161 to minimize undesirable gaps and improve HMI 170 performance.

One or more securing members 177 can be spaced apart along a width of the retention bracket 175 and extend toward the printed circuit board 171. By non-limiting example, the securing members 177 can be positioned at locations where firm contact between printed circuit board 171 and front housing 161 is desirable, e.g., such as at locations for receiving user input. Although aspects of the securing members 177 and the retention bracket 175 are illustrated herein, it should be appreciated that variations (i.e., quantity or location) can be made while remaining within the scope of the present subject matter.

As illustrated, the securing members 177 can include one or more bracing arms 178. The bracing arms 178 can extend outward from the chamber 176 of the retention bracket 175 as shown. In a non-limiting example, the bracing arms 178 can extend toward the inner pocket assembly 140. As such, the bracing arms 178 can be configured for engaging with a portion of the rear housing 150. In this regard, the bracing arms 178 can be used to temporarily align and/or hold one or more of the retention bracket 175 and front housing 161 in place while establishing a secure connection during assembly (e.g., using a fastener or a fastening element, as discussed previously).

Although exemplary securing members 177 and bracing arms 178 are illustrated herein, it should be appreciated that other fastening mechanisms such as an adhesive, a gasket, a receiving edge, a catch, a rivet, a snap-fit locking mechanism, or any suitable means to secure the printed circuit board 171 and the retention bracket 175 therebetween the front housing 161 and rear housing 150 can be included while remaining within the scope of the present subject matter.

In the illustrated example, the HMI 170 can further include an indicia panel 179 and be integrated into the outer pocket panel 169. The indicia panel 179 can include input components, such as one or more of a variety of electrical, mechanical, or electro-mechanical input devices including rotary dials, push buttons, and touch pads. The indicia panel 179 can further include one or more display components, such as a digital display device or one or more indicator light assemblies designed to provide operational feedback to a user. The indicia panel 179 can define a surface along which a user can directly interact to operate the door assembly 100.

Further, by way of alternative or additional non-limiting example, the indicia panel 179 can include a transparent, semi-transparent, or translucent body and an opaque masking material that is selectively printed on an outer surface of the translucent body to define one or more indicator zones, user inputs, and other illuminated features on the indicia panel 179 designed to provide operational feedback to a user, such as for purposes of indicating operating status or other conditions of the dishwasher 10.

In general, one or both of the outer pocket panel 169 and indicia panel 179 can be constructed from any suitably rigid material to facilitate operation of the dishwasher 10. For example, various features of the outer pocket assembly 160, including the indicia panel 179, can be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers.

Figure 8:
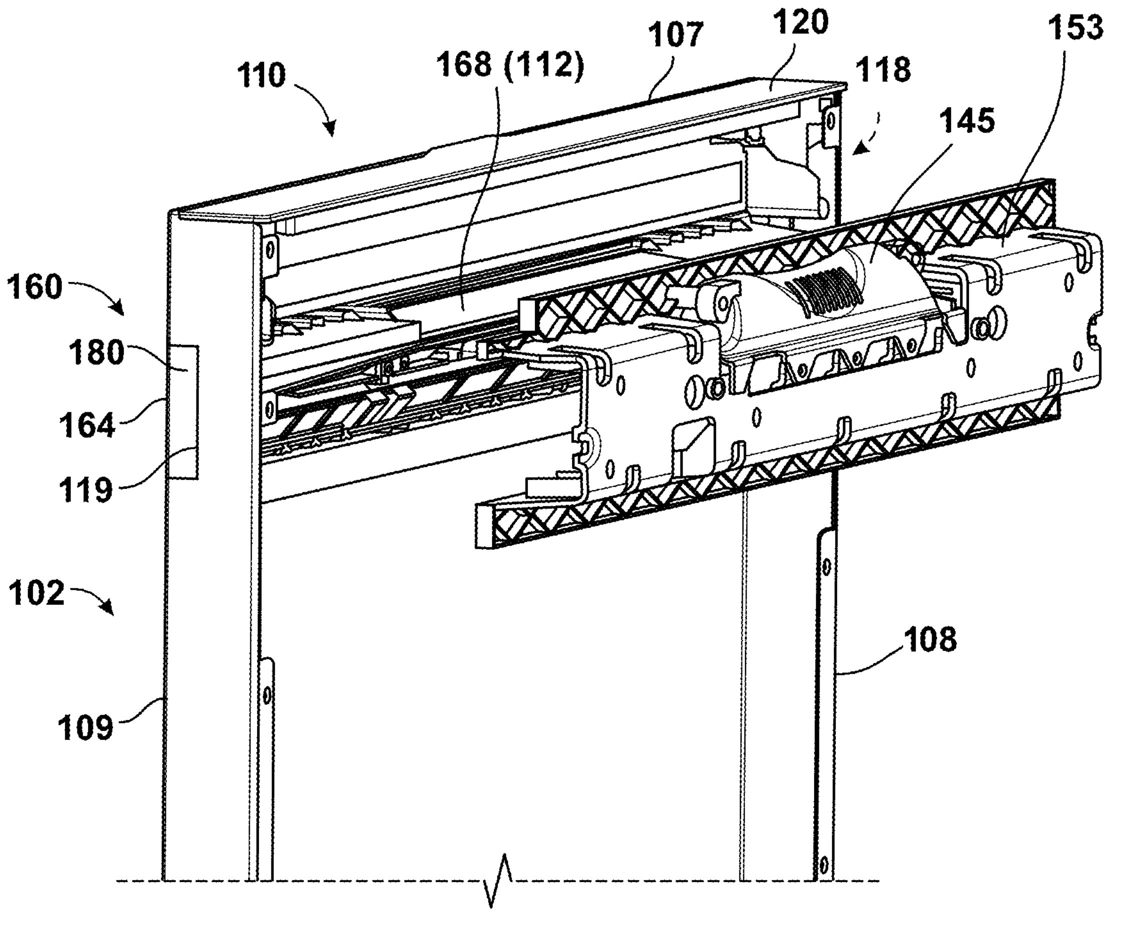
FIG. 8 is an exploded rearview of the door assembly from FIG. 5 in accordance with various aspects described herein.

FIG. 8 illustrates an assembled outer pocket assembly 160 mounted on the outer panel 102 and an assembled outer pocket assembly 160 aligned with the pocket opening 112.

As shown, the aperture 168 of the outer pocket assembly 160 can align with the pocket handle 145 of the inner pocket assembly 140, thus defining a continuous opening permitting access to the pocket handle 145 by a user through the outer pocket assembly 160.

When installed, the assembled outer pocket assembly 160 closes a portion of the pocket opening 112 of the outer panel 102, including portions of the pocket opening 112 defined by the left notch 118 and right notch 119. Further, at least one of the left edge 163 or the right edge 164 includes a biasing element 180 to bias the at least one of the left edge 163 or the right edge 164 into the corresponding left notch 118 or right notch 119. The biasing element 180 will be discussed in more detail below.

Figure 9A:
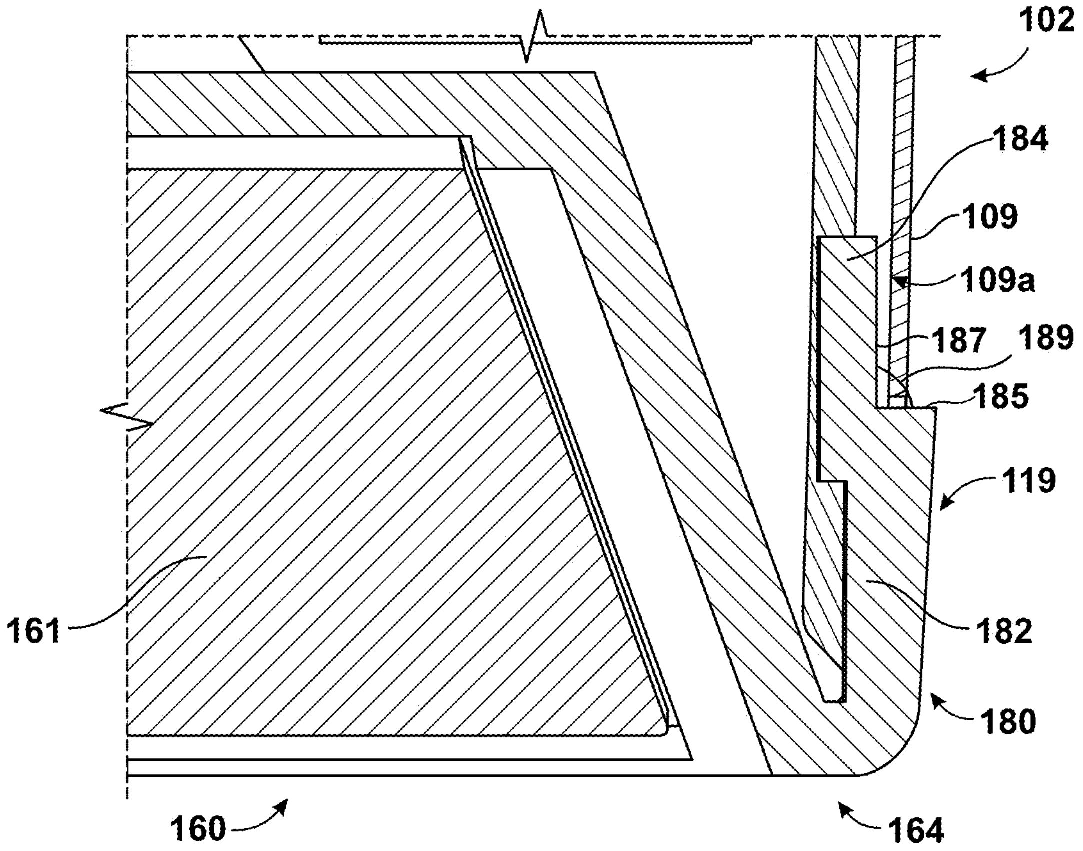
FIG. 9A is a cross-sectional view of the door assembly of FIG. 4 along line IX-IX in accordance with an aspect described herein.

Turning to FIG. 9A, a cross-sectional view taken along line IX-IX from FIG. 4 to more clearly illustrate the biasing element 180. The biasing element 180 includes a non-reduced thickness portion 182 received in a corresponding right notch 119 and a reduced thickness portion 184. The reduced thickness portion 184 bears against an inner surface 109*a* of the corresponding right sidewall 109. In a non-limiting example, a change in thickness between the non-reduced thickness portion 182 and the reduced thickness portion 184 is commensurate to a thickness of the corresponding left sidewall 108 or right sidewall 109 at the corresponding left notch 118 or right notch 119. When the outer panel has the benefit of being formed of a single piece, the pocket opening 112, as discussed herein, having left and right notches 118, 119 improves the ease of assembly by readily allowing the pocket handle assembly 130 to align through pocket opening 112 and have the outer pocket assembly 160 close the pocket opening 112. Further, given variations in part tolerances and between mounted components, conventional techniques for mounting a pocket handle assembly along a single-piece outer panel can result in undesirable gaps along the exterior of the outer panel. The pocket handle assembly 130, as described herein, particularly, the biasing elements (i.e., biasing element 180), can be designed to provide secure engagement with the outer panel 102 and minimize undesirable gaps.

The non-reduced thickness portion 182 includes an upper wall 185 that extends at least partially past the right sidewall 109. An outer wall 187 of the reduced thickness portion 184 can extend vertically and confront or face an inner portion of the right side wall 109. An angle 189 is measured between the upper wall 185 and the outer wall 187. The angle 189 is illustrated as having a measurement of 90°, however other angles are contemplated. Angles about 90° can ease the coupling of the outer pocket assembly 160 to the outer panel 102 and accommodate variances in alignment when mounting the outer pocket assembly 160 to the outer panel 102. Further, angles about 90° can have advantages when engaging the outer pocket assembly 160 and the outer panel 102 and lessen an occurrence of disengagement.

Figure 9B:
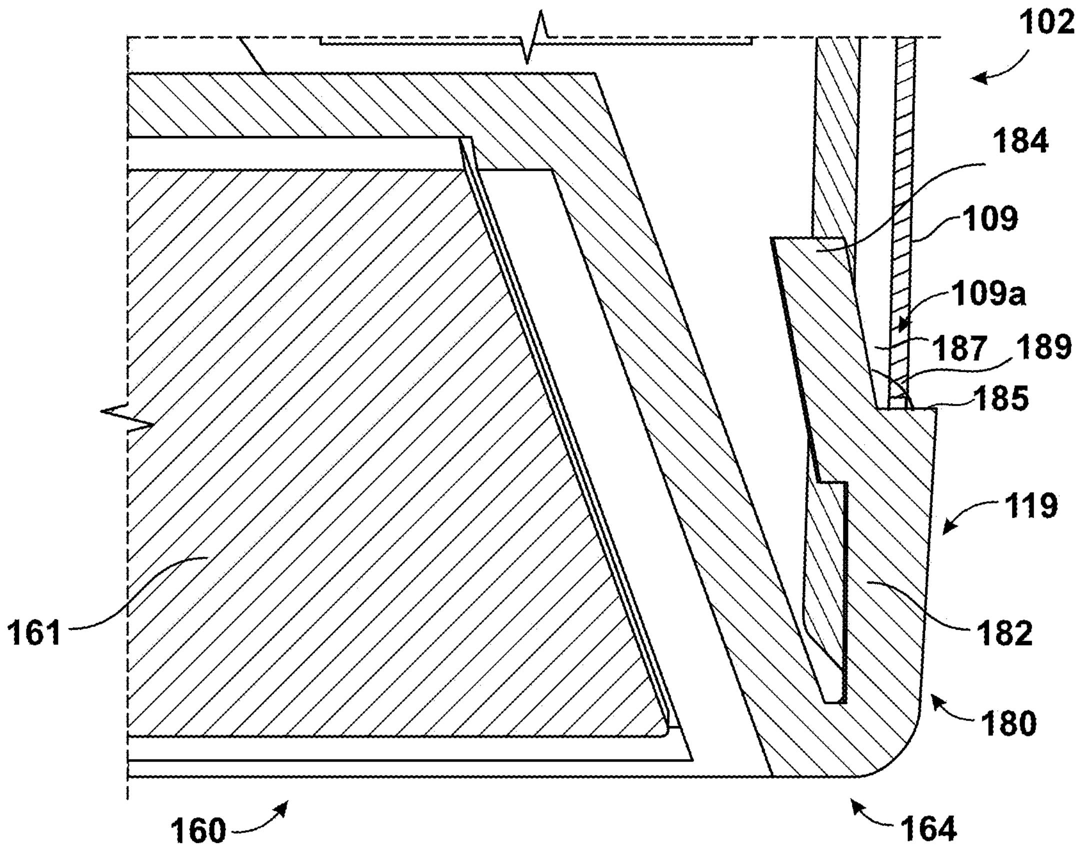
FIG. 9B is a cross-sectional view of the door assembly of FIG. 4 along line IX-IX in accordance with an alternative aspect described herein.

Turning to FIG. 9B, an alternative embodiment of the biasing element 180 is shown therein, with reference characters common to the components of embodiment of FIG. 9A and FIG. 9B being the same. FIG. 9B generally has a reduced thickness portion 184 extending in a direction greater than 90° from the step 185. The angle 189 is greater than 90° and less than 140°. Angles greater than 90° can ease the coupling of the outer pocket assembly 160 to the outer panel 102 and accommodate wider variances in alignment while still maintaining the desired connection.

Figure 10:
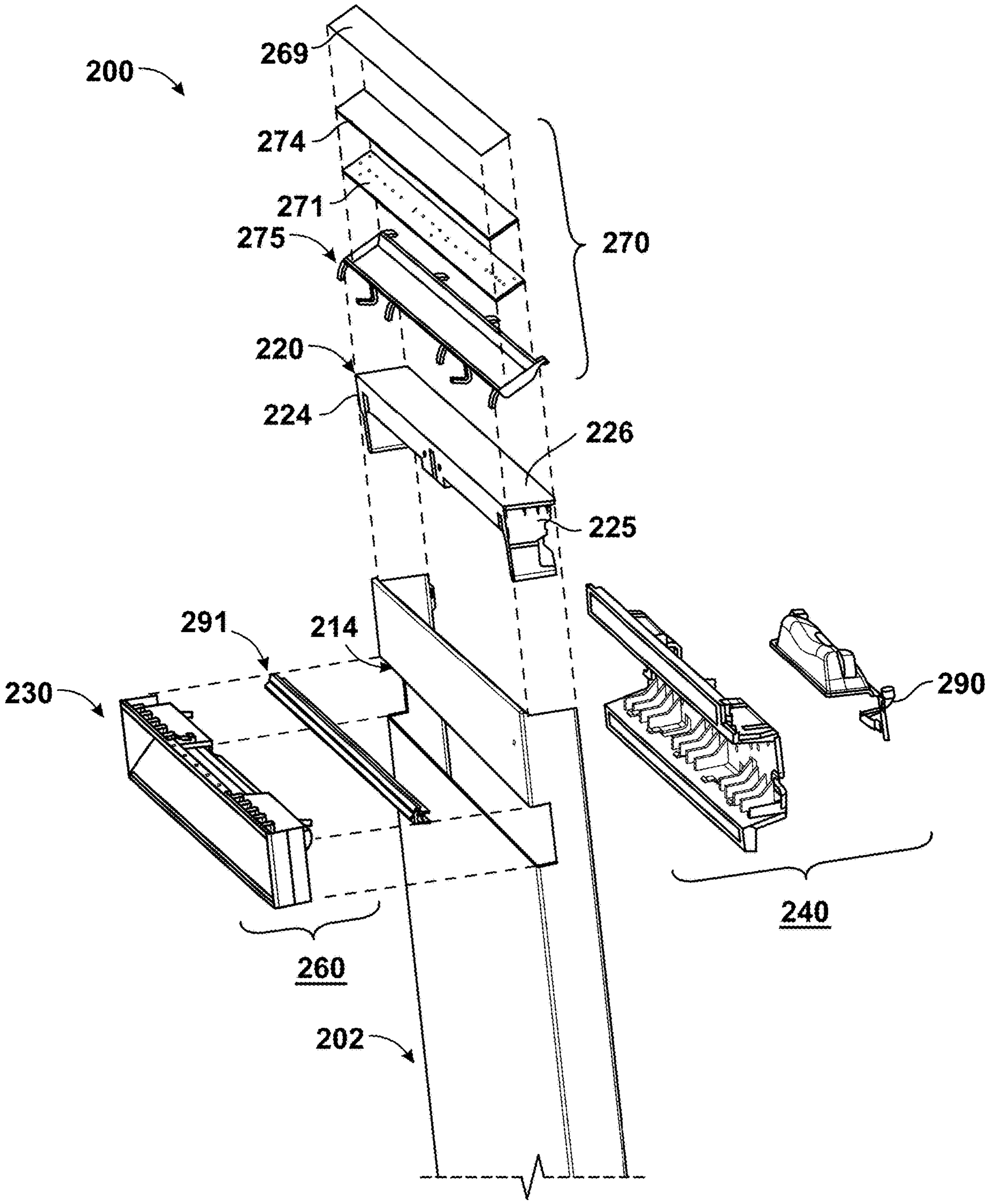
FIG. 10 is an exploded view of another door assembly, similar to the door assembly of FIG. 4, that can be utilized with the dishwasher of FIG. 1 in accordance with various aspects described herein.

Turning to FIG. 10, another door assembly 200 that can be utilized with the dishwasher 10 of FIG. 1, including for use as the door assembly 20 or for use as the door assembly 100 as shown in FIG. 4. Exploded components in the door assembly 200 is similar to the exploded components in the door assembly 100 shown in FIG. 5; therefore, like parts will be described with like numerals increased by 100, with it being understood that the description of the like parts of the door assembly 100 applies to the door assembly 200, except where noted.

The door assembly 200 can include an outer panel 202. The outer panel 202 can be a single-piece panel, though this need not be the case. The door assembly 200 can further include a top cap 220 and a pocket handle assembly 230. The pocket handle assembly 230 includes an inner pocket assembly 240 and an outer pocket assembly 260. The inner pocket assembly 240 and the outer pocket assembly 260 can be positioned on opposing sides of the outer panel 202 as shown.

A periphery 214 along the outer panel 202 defines an outside surface of the pocket opening 212. A trim 291 can be located at one or more portions of the periphery 214. The trim 291 can be used for support, aesthetics, or any combination thereof. The trim 291 can be any number of trim pieces located between the outer pocket assembly 260 and the periphery 214 that provide rigidity, aesthetics or any combination thereof. In an assembled embodiment, trim 291 can couple to a portion of the inner pocket assembly 240 to secure connection with components of the inner pocket assembly 240.

The top cap 220 includes a top surface 226 and spaced-apart left and right cap sidewalls 224, 225. One difference is the top cap 220 can include a human machine interface (HMI) 270 disposed on the top surface 226 of the top cap 220. The HMI 270 includes an indicia panel 279, a printed circuit board 271, a retention bracket 275. The printed circuit board 271 and the retention bracket 275 can be disposed between the indicia panel 279 and the top surface 226 of the top cap 220. An adhesive portion 274 can further be included therebetween the indicia panel 279 and the top surface 226.

Having the top cap 220 include the HMI 270 and an indicia panel 279 can set pressure on an upper portion the outer panel 202 via the weight of the additional components along the top cap 220, any pressure a user may cause when interacting with the indicia panel 279 or opening or closing the door assembly 200, or any combination thereof. The pocket opening 212, as discussed herein, having the trim 291 can bolster the outer panel 202 to withstand additional pressures applied from the top cap.

Another difference is that a light 290 is provided and located along a portion of the in the inner pocket assembly 240. In this manner, the light 290 can provide additional illumination for an indicator light.

Benefits associated with the disclosure described herein include reducing part counts in appliances, reducing assembly operation steps, and improving cost benefits. By coupling the pocket handle assembly to the outer panel as described herein, one or both of the inner pocket assembly and outer pocket assembly can be assembled in advance. Thus, the number of components to align to the outer panel for assembly can be simplified. Further, by utilizing a single-piece outer panel, no additional steps of assembling the outer panel are necessary and the door can have an aesthetically advantageous uniform appearance.

Additionally, by having notches in the sidewalls and including one or more biasing elements in the pocket handle assembly, the pocket handle assembly can more readily align with the outer panel during installation and further reduce assembly operation steps.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Moreover, while "a set of" various elements have been described, it will be understood that "a set" can include any number of the respective elements, including only one element. Any directional references (e.g., upper, lower, upward, downward, left, right, leftward, rightward, top, bottom, above, below, vertical, horizontal, rearward, and counterclockwise) are only used for identification purposes to aid the reader's understanding of the present disclosure, and do not create limitations, particularly as to the position, orientation, or use of examples/embodiments/aspects.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

Further aspects of the disclosure are provided by the subject matter of the following clauses:

A dishwasher comprising: a cabinet defining an interior; a tub located within the interior and defining a washing chamber with an open face; and a door assembly moveably mounted to the cabinet for selectively closing the open face, the door assembly comprising: a single-piece outer panel defining a front face at least partially bound by a left sidewall and a right sidewall, wherein the single-piece outer panel has a pocket opening spanning the front face between and including a portion of the left sidewall and a portion of the right sidewall to form a corresponding left notch in the left sidewall and a right notch in the right sidewall; and a pocket handle assembly accessible through the pocket opening, the pocket handle assembly spanning the pocket opening and closing a portion of the left notch and a portion of the right notch, wherein the pocket handle assembly defines an outer pocket panel accessible through the pocket opening.

The dishwasher of any preceding clause, wherein the pocket handle assembly includes a handle recess.

The dishwasher of any preceding clause, wherein the handle recess is at least partially located above the outer pocket panel.

The dishwasher of any preceding clause, wherein the outer pocket panel is at an acute angle relative to the front face.

The dishwasher of any preceding clause, further comprising a human machine interface having an indicia panel, wherein the indicia panel is integrated in the outer pocket panel.

The dishwasher of any preceding clause, further comprising a light source emitting light onto the front surface.

The dishwasher of any preceding clause, wherein the light source emits a projected image.

The dishwasher of any preceding clause, further comprising a backlight emitting light onto a rear portion of the outer pocket panel.

The dishwasher of any preceding clause, wherein the backlight emits a uniform light over an entirety of the rear portion of the outer pocket panel.

The dishwasher of any preceding clause, wherein the single-piece outer panel provides the door assembly with a uniform appearance.

The dishwasher of any preceding clause, wherein the pocket handle assembly comprises a front housing having a top edge, a left edge, a right edge, and a front surface is located below the top edge and extends between the left edge and the right edge.

The dishwasher of any preceding clause, wherein the pocket handle assembly further includes a handle recess formed at least in a portion of the top edge.

The dishwasher of any preceding clause, wherein the front surface is located below the top edge and further includes a back wall extending between the front surface and the top edge, with a portion of the handle recess formed in the back wall.

The dishwasher of any preceding clause, wherein the outer pocket panel is at an acute angle relative to the front face.

The dishwasher of any preceding clause, wherein the outer pocket panel includes an indicia panel.

The dishwasher of any preceding clause, further comprising a light source emitting light onto the indicia panel.

The dishwasher of any preceding clause, wherein the light source emits a projected image.

The dishwasher of any preceding clause, wherein the projected image is information related to an operation of the dishwasher.

The dishwasher of any preceding clause, further comprising a backlight emitting light onto a rear portion of the indicia panel.

The dishwasher of any preceding clause, wherein the backlight emits a uniform light over the entire rear portion of the indicia panel.

A dishwasher comprising: cabinet defining an interior; a tub located within the interior and defining a washing chamber with an open face; and a door assembly moveably mounted to the cabinet for selectively closing the open face, the door assembly comprising: a single-piece, outer panel defining a front face at least partially bounded by a left sidewall and a right sidewall, a rear face obverse of the front face, and a pocket opening spanning the front face between and including a portion of the left sidewall and the right sidewall to form a corresponding left notch in the left sidewall and a right notch in the right sidewall; and a pocket handle assembly comprising: a rear housing affixed to the rear face and aligned with the pocket opening; and a front housing affixed to the rear housing and spanning the pocket opening, with the front housing having a left tab closing at least a portion of the left notch and a right tab closing at least a portion of the right notch.

The dishwasher of any preceding clause, wherein a portion of the outer panel is retained between opposing portions of the rear housing and the front housing.

The dishwasher of any preceding clause, further comprising a snap-fastener carried by the rear housing and a snap element carried by the front housing, with the snap-fastener and the snap element secure to each other in snapping engagement.

The dishwasher of any preceding clause, wherein at least one of the left tab or the right tab includes a biasing element to bias the at least one of the left tab or the right tab into the corresponding left notch or right notch.

The dishwasher of any preceding clause, wherein the at least one of the left tab or the right tab includes a non-reduced thickness portion received in the corresponding left notch or right notch and a reduced thickness portion defining a step, which bears against an inner surface of the corresponding left sidewall or right sidewall.

The dishwasher of any preceding clause, wherein a change in thickness between the non-reduced thickness portion and the reduced thickness portion is commensurate to a thickness of the corresponding left sidewall or right sidewall at the corresponding left notch or right notch.

The dishwasher of any preceding clause, wherein the front housing includes an outer pocket panel facing outward from the pocket opening.

The dishwasher of any preceding clause, wherein the outer pocket panel is at an angle relative to the front face.

The dishwasher of any preceding clause, wherein the outer pocket panel includes an indicia panel.

The dishwasher of any preceding clause, wherein a printed circuit board is located in a chamber between the outer pocket panel and the rear housing.

The dishwasher of any preceding clause, further comprising a light source emitting light onto the outer pocket panel.

The dishwasher of any preceding clause, wherein the light source emits a projected image.

The dishwasher of any preceding clause, further comprising a backlight emitting light onto a rear portion of the outer pocket panel.

The dishwasher of any preceding clause, wherein the backlight emits a uniform light over the entire rear portion of the outer pocket panel.

The dishwasher of any preceding clause, wherein the rear housing and the front housing define an aperture above the outer pocket panel.

The dishwasher of any preceding clause, further comprising an ingress confronting the aperture and defining a pocket handle accessible through the pocket opening, whereby a user can pass their fingers through the pocket opening, through the front housing, through the ingress and into the finger pocket.

The dishwasher of any preceding clause, wherein the pocket handle is centrally located between the left sidewall and the right sidewall.

What is claimed is:

1. A dishwasher comprising:

a cabinet defining an interior;

a tub located within the interior and defining a washing chamber with an open face; and a door assembly moveably mounted to the cabinet for selectively closing the open face, the door assembly comprising:

a single-piece outer panel defining a front face at least partially bound by a left sidewall and a right sidewall, wherein the single-piece outer panel has a pocket opening spanning the front face between and including a portion of the left sidewall and a portion of the right sidewall to form a corresponding left notch in the left sidewall and a right notch in the right sidewall; and a pocket handle assembly accessible through the pocket opening, the pocket handle assembly spanning the pocket opening and closing a portion of the left notch and a portion of the right notch, wherein the pocket handle assembly defines an outer pocket panel accessible through the pocket opening.

2. The dishwasher of claim 1 wherein the pocket handle assembly includes a handle recess.

3. The dishwasher of claim 2 wherein the handle recess is at least partially located above the outer pocket panel.

4. The dishwasher of claim 1 wherein the outer pocket panel is at an acute angle relative to the front face.

5. The dishwasher of claim 1 further comprising a human machine interface having an indicia panel, wherein the indicia panel is integrated in the outer pocket panel.

6. The dishwasher of claim 1 wherein the pocket handle assembly comprises a front housing having a top edge, a left edge, a right edge, and a front surface is located below the top edge and extends between the left edge and the right edge.

7. The dishwasher of claim 6 wherein the pocket handle assembly further includes a handle recess formed at least in a portion of the top edge.

8. The dishwasher of claim 7 wherein the front surface is located below the top edge and further includes a back wall extending between the front surface and the top edge, with a portion of the handle recess formed in the back wall.

9. A dishwasher comprising:

a cabinet defining an interior;

a tub located within the interior and defining a washing chamber with an open face; and a door assembly moveably mounted to the cabinet for selectively closing the open face, the door assembly comprising:

a single-piece, outer panel defining a front face at least partially bounded by a left sidewall and a right sidewall, a rear face obverse of the front face, and a pocket opening spanning the front face between and including a portion of the left sidewall and the right sidewall to form a corresponding left notch in the left sidewall and a right notch in the right sidewall; and a pocket handle assembly comprising:

a rear housing affixed to the rear face and aligned with the pocket opening; and a front housing affixed to the rear housing and spanning the pocket opening, with the front housing having a left tab closing at least a portion of the left notch and a right tab closing at least a portion of the right notch.

10. The dishwasher of claim 9 wherein a portion of the outer panel is retained between opposing portions of the rear housing and the front housing.

11. The dishwasher of claim 9 further comprising a snap-fastener carried by the rear housing and a snap element carried by the front housing, with the snap-fastener and the snap element secure to each other in snapping engagement.

12. The dishwasher of claim 9 wherein at least one of the left tab or the right tab includes a biasing element to bias the at least one of the left tab or the right tab into the corresponding left notch or right notch.

13. The dishwasher of claim 12 wherein the at least one of the left tab or the right tab includes a non-reduced thickness portion received in the corresponding left notch or right notch and a reduced thickness portion defining a step, which bears against an inner surface of the corresponding left sidewall or right sidewall.

14. The dishwasher of claim 13 wherein a change in thickness between the non-reduced thickness portion and the reduced thickness portion is commensurate to a thickness of the corresponding left sidewall or right sidewall at the corresponding left notch or right notch.

15. The dishwasher of claim 9 wherein the front housing includes an outer pocket panel facing outward from the pocket opening.

16. The dishwasher of claim 15 wherein the outer pocket panel is at an angle relative to the front face.

17. The dishwasher of claim 16 wherein the outer pocket panel includes an indicia panel.

18. The dishwasher of claim 17 wherein a printed circuit board is located in a chamber between the outer pocket panel and the rear housing.

19. The dishwasher of claim 15 wherein the rear housing and the front housing define an aperture above the outer pocket panel.

20. The dishwasher of claim 19 further comprising an ingress confronting the aperture and defining a pocket handle accessible through the pocket opening, whereby a user can pass their fingers through the pocket opening, through the front housing, through the ingress and into a finger pocket.

* * * * *